US012805617B2

(12) United States Patent
Xiao

(10) Patent No.: US 12,805,617 B2
(45) Date of Patent: Nov. 24, 2026

(54) CAMERA STORAGE MODULE AND STORAGE BAG

(71) Applicant: Yuxin Xiao, Shanghai (CN)

(72) Inventor: Yuxin Xiao, Shanghai (CN)

( * ) Notice: Subject to any disclaimer, the term of this patent is extended or adjusted under 35 U.S.C. 154(b) by 116 days.

(21) Appl. No.: 19/032,160

(22) Filed: Jan. 20, 2025

(65) Prior Publication Data

US 2026/0191308 A1 Jul. 9, 2026

(30) Foreign Application Priority Data

Jan. 3, 2025 (CN) ......................... 202510009752.2

(51) Int. Cl.
*A45C 11/38* (2006.01)
*G03B 17/56* (2021.01)

(52) U.S. Cl.
CPC ............ *A45C 11/38* (2013.01); *G03B 17/561* (2013.01)

(58) Field of Classification Search
CPC .............................. A45C 11/38; G03B 17/561
USPC .......................................................... 396/420
See application file for complete search history.

(56) References Cited

U.S. PATENT DOCUMENTS

2006/0013575 A1 * 1/2006 Senba .................. H04N 23/663 348/E5.046

* cited by examiner

*Primary Examiner* — Joel W Fosselman
(74) *Attorney, Agent, or Firm* — JEEN IP LAW, LLC

(57) ABSTRACT

A camera storage module and a storage bag are provided, the camera storage module includes a first storage module and a second storage module. The first storage module is provided with a first storage space for accommodating a camera body, and the second storage module is provided with a second storage space for accommodating a lens. The first storage module is spliced with the second storage module, so that the first storage space is communicated with the second storage space for connecting the camera body to the lens for storage. Bottoms of the first storage module and the second storage module are both connected to an adjustment base component, which drives the camera body and the lens to achieve a multi-mode conversion. The above technical solution has advantages of stable storage, good protection effect, combined storage, and convenient use.

10 Claims, 8 Drawing Sheets

CAMERA STORAGE MODULE AND STORAGE BAG

CROSS-REFERENCE TO RELATED APPLICATIONS

This application claims priority to Chinese Patent Application No. 202510009752.2, filed on Jan. 3, 2025, which is hereby incorporated by reference in its entirety.

TECHNICAL FIELD

The present disclosure relates to the field of camera storage technologies, and in particular, to a camera storage module and a storage bag.

BACKGROUND

With the increasing number of people traveling, cameras are needed to capture the beautiful scenery in scenic spots. However, in crowded scenic spots, holding a camera in hand is inconvenient and prone to collision. With the development of multimedia technology, more and more individuals or enterprises are purchasing various professional shooting equipment to obtain the materials they need. Therefore, carrying shooting equipment for travel presents storage and portability issues, and a good camera storage tool is needed.

At present, camera storage tools are just simple partitioned storage boxes that only have a function of storing cameras. They cannot fit the camera body and lens well, and have poor anti-collision and anti-drop effects, which cannot effectively protect the camera.

SUMMARY

The purpose of the present disclosure is to provide a camera storage module and a storage bag, which have advantages of stable storage, good protection effect, combined storage, and convenient use, in response to defects and deficiencies of the prior art.

To achieve the above objectives, a first aspect of the present disclosure provides a camera storage module, including a first storage module and a second storage module, where the first storage module is provided with a first storage space for accommodating a camera body, and the second storage module is provided with a second storage space for accommodating a lens, where the first storage module is spliced with the second storage module so that the first storage space is communicated with the second storage space for connecting the camera body to the lens for storage; bottoms of the first storage module and the second storage module are both connected to an adjustment base component, where the adjustment base component drives the camera body and lens to achieve a multi-mode conversion.

In some embodiments of the present disclosure, there are a plurality of second storage modules, and the plurality of second storage modules correspond to lenses having different sizes; the first storage module is selectively spliced with different second storage modules for the camera body to connect a corresponding lens for storage.

In some embodiments of the present disclosure, there are a plurality of first storage modules, and the plurality of first storage modules correspond to camera bodies having different sizes; the second storage module is selectively spliced with different first storage modules for the lens to connect a corresponding camera body for storage.

In some embodiments of the present disclosure, the first storage module and the second storage module are detachably connected through a magnetic suction component or a buckle component; the first storage module and the second storage module are detachably connected to the adjustment base component through a magnetic suction component or a buckle component.

In some embodiments of the present disclosure, the adjustment base component includes a fixed seat, an adjustment seat, a first adjustment rod, a second adjustment rod, and a third adjustment rod; where the fixed seat is provided with a plurality of engagement teeth, the first adjustment rod is rotatably connected to the adjustment seat, the first adjustment rod is selectively engaged with one of the engagement teeth, the second adjustment rod is rotatably connected to the fixed seat; a fixed groove matches with the second adjustment rod is provided on the adjustment seat; the third adjustment rod is rotatably connected to the fixed seat and the adjustment seat, respectively; where a cooperation of the first adjustment rod, the second adjustment rod, and the third adjustment rod with each other, a pitch angle of the adjustment seat is changed to achieve the multi-mode conversion between the camera body and the lens.

In some embodiments of the present disclosure, a light shielding component is provided on the second storage module, the light shielding component serves as a part of the first storage module when folded and is configured to prevent strong light from shining on a camera body screen when unfolded; a bracket is further rotatably connected to the second storage module, the bracket serves as a part of the first storage module when folded and is configured to install a mobile phone, a power bank, and a portable hard drive when unfolded.

In some embodiments of the present disclosure, the camera storage module further includes a third storage module and a fourth storage module, where the third storage module is connected to the first storage module for storing the camera body, and the fourth storage module is connected to the second storage module for storing the lens In some embodiments of the present disclosure, a first retrieval slot is provided on the first storage module; and the first retrieval slot is communicated with the first storage space for easy retrieval and placement of the camera body; a second retrieval slot is provided on the second storage module; and the second retrieval slot is communicated with the second storage space for easy retrieval and placement of the lens.

In some embodiments of the present disclosure, the third storage module is connected to the first storage module through a magnetic suction component or a buckle component, and the fourth storage module is connected to the second storage module through a magnetic suction component or a buckle component.

A second aspect of the present disclosure provides a camera storage bag, including a bag body and the camera storage module, where the camera storage module is provided in the bag body.

After adopting the above technical solution, the beneficial effects of the present disclosure are as following.

1. In the present disclosure, the first storage module can be spliced with the second storage module, so that the first storage space and the second storage space are communicated to each other, thereby forming a larger storage space that can be used for an overall storage of the camera body after connecting the lens. There is no need to separate the camera body and lens for storage, rendering camera storage more convenient. At the same time, the camera can be taken out of the storage module at any time during use, which is convenient for camera use.

2. In the present disclosure, there are a plurality of second storage modules, the plurality of second storage modules correspond to different sizes of lenses, and the second storage spaces correspond to accommodating lenses of different sizes and types; the first storage module can be selectively spliced with different second storage modules to form different components for connecting corresponding lenses to the camera body for storage, thereby improving the flexibility of the storage module. By combining the first storage module with different second storage modules, it can adapt to the storage needs of connecting different lenses to the camera body, rendering it more convenient for a user to store and carry the camera when going out.

In the present disclosure, by providing the adjustment base component under the first storage module and the second storage module, the camera body and lens can be adjusted at serval angles through the adjustment base component, thereby achieving a multi-mode conversion of the camera body and the lens, rendering the camera body and the lens convenient and flexible to use in the multi-mode conversion.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or the prior art. It is obvious that the accompanying drawings described below are only some embodiments of the present disclosure. For those skilled in the art, other drawings can be obtained based on these drawings without creative work.

Numeral reference: 10—first storage module; 110—first retrieval slot; 20—second storage module; 210—second retrieval slot; 30—fixed seat; 300—engagement teeth; 301—limiting column; 31—adjustment seat; 310—fixed groove; 32—first adjustment rod; 33—second adjustment rod; 34—third adjustment rod; 40—light shielding plate; 41—connector; 50—third storage module; 51—fourth storage module; 6—bracket.

DESCRIPTION OF EMBODIMENTS

The present disclosure will be further described in detail with reference to the accompanying drawings.

Specific embodiments are only to explain the present disclosure and does not limit the present disclosure. After reading this specification, those skilled in the art may make modifications to this embodiment as needed without any creative work, but as long as they are within the scope of the claims of the present disclosure.

Figure 1:
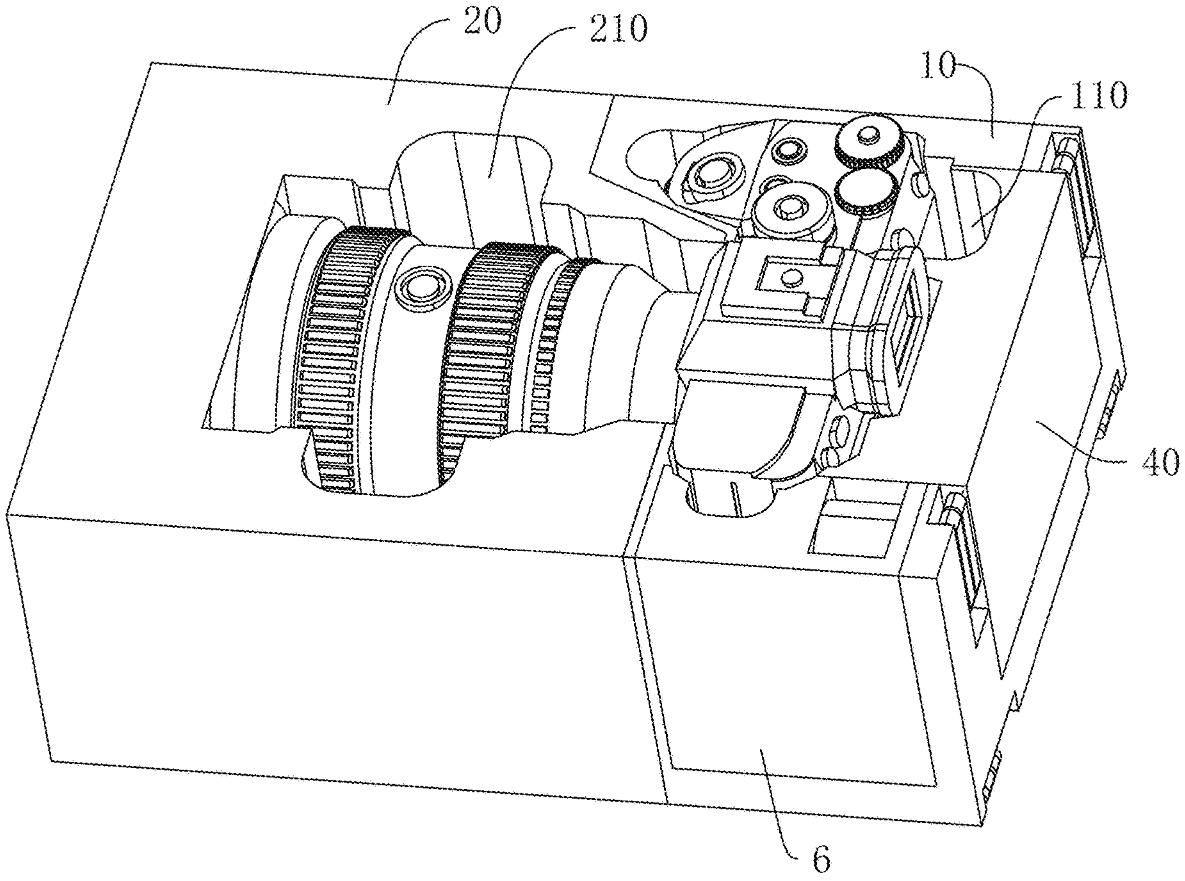
FIG. 1 is a schematic diagram of a partial structure of an embodiment of the present disclosure.
Figure 2:
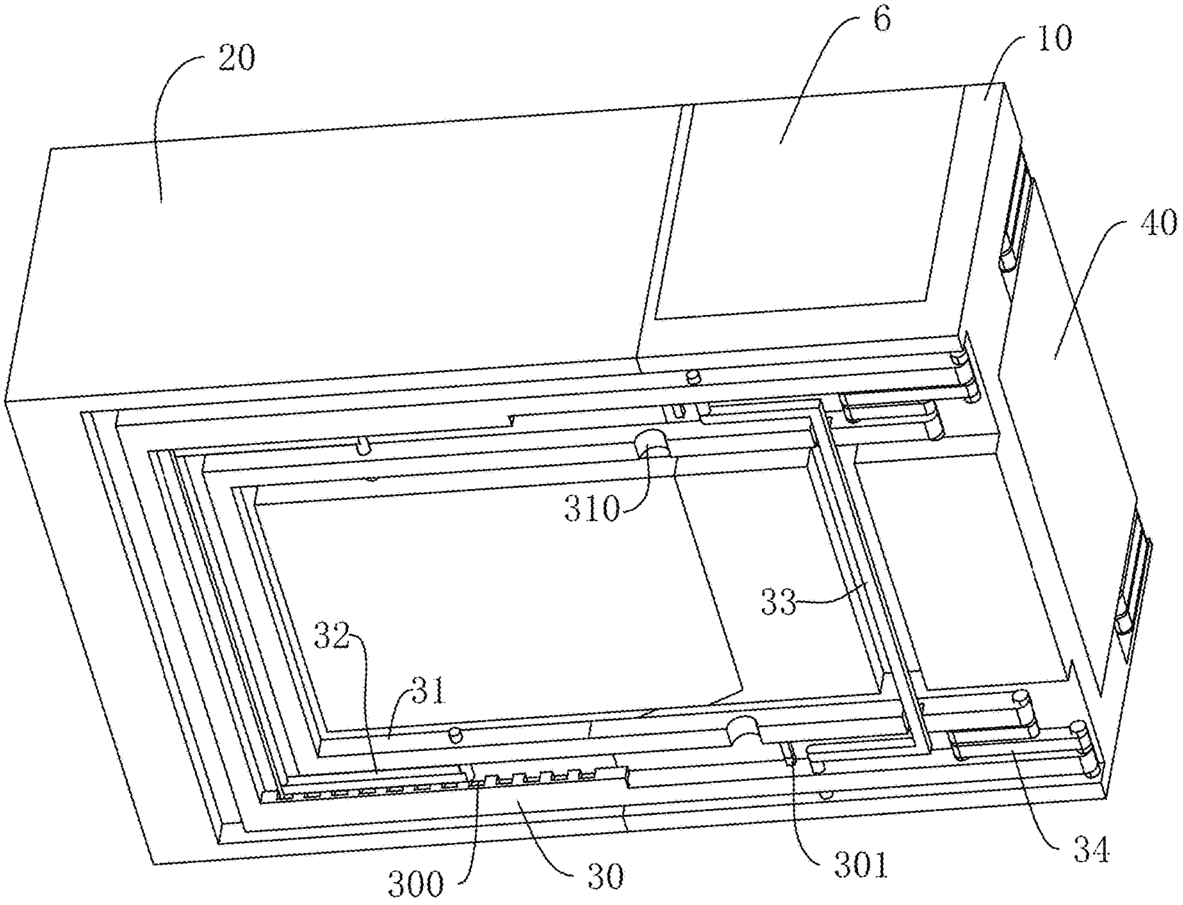
FIG. 2 is a schematic diagram from another perspective of FIG. 1.
Figure 3:
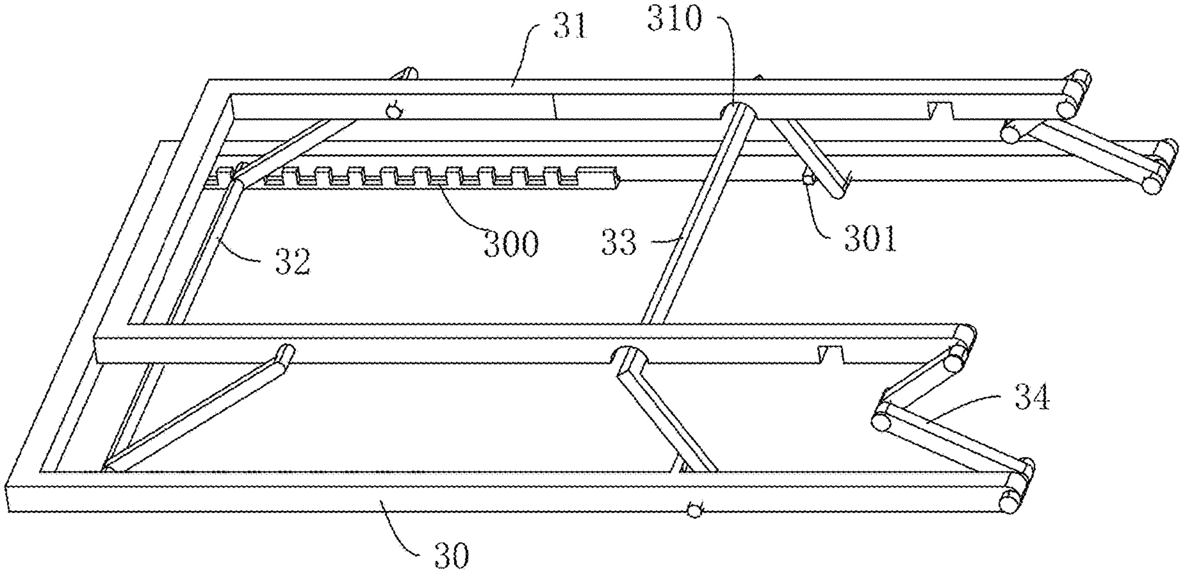
FIG. 3 is a schematic structural diagram of an adjustment base component in an embodiment.

Firstly, this embodiment relates to a camera storage module, as shown in FIGS. 1-3, including a first storage module 10 and a second storage module 20. The camera in this embodiment can be a camera, a camcorder, an electric camera, or other device composed of a camera body and a lens.

The first storage module 10 is provided with a first storage space for accommodating the camera body, and the second storage module 20 is provided with a second storage space for accommodating the lens. The first storage module 10 can be spliced with the second storage module 20, so that the first storage space and the second storage space are communicated with each other, thereby forming a larger storage space that can be used for an overall storage of the camera body after connecting the lens, without a need to separate the camera body and lens for storage. The storage of the camera is more convenient, and the camera can also be taken out and used as a whole, which is more convenient. At the same time, bottoms of the first storage module 10 and the second storage module 20 are both connected to an adjustment base component. An installation area that is penetrated is provided at bottoms of outer sides of the first storage module 10 and the second storage module 20, the adjustment base component is installed in the installation area, the adjustable base components provided at the bottoms of the first storage module 10 and the second storage module 20 enable the camera body and the lens to achieve a multi-mode conversion, rendering it convenient and flexible to use the camera body and the lens in the multi-mode conversion.

In this embodiment, there are a plurality of second storage modules 20, and the plurality of second storage modules 20 correspond to different sizes of lenses; the second storage spaces correspond to accommodating lenses of different sizes and types. The first storage module 10 can be selectively spliced with different second storage modules 20 to form different components for connecting corresponding lenses to the camera body for storage, thereby improving the flexibility of the storage module. By combining the first storage module 10 with different second storage modules 20, it can adapt to the storage needs of connecting different lenses to the camera body, rendering it more convenient for a user to store and carry the camera when going out.

In an implementation mode, there are a plurality of first storage modules 10, and the plurality of first storage modules 10 correspond to different sizes and types of camera bodies. The second storage module 20 can be selectively spliced with different first storage modules 10 for connecting the lens to the corresponding camera body for storage, thereby meeting the storage needs of different types of camera bodies, thereby improving the adaptability of the storage module, and optimizing the use experience of the storage module.

In this embodiment, the first storage module 10 and the second storage module 20 are detachably connected through a magnetic suction component, which ensures a stable connection between the first storage module 10 and the second storage module 20 and achieves a good storage and protection effect on the overall camera. It is also convenient for a disassembly between the first storage module 10 and the second storage module 20, achieving a flexible combination between the first storage module 10 and the second storage module 20, which can flexibly adapt to various combination scenarios of the camera, with better storage adaptability and better user experience. At the same time, the first storage module 10 and the second storage module 20 are connected to the adjustment base component through a magnetic suction component or a buckle component, which not only ensures a stable connection between the first storage module 10 and the second storage module 20 with the adjustment base component, but also facilitates a stable support of the adjustment base component for the camera body and the lens in various modes.

In this embodiment, the first storage module 10 and the second storage module 20 can also be detachably connected to each other through other structures such as buckle components. At the same time, the first storage module 10 and the second storage module 20 can also be detachably connected to the adjustment base component through other structures such as buckle components.

In this embodiment, in order to achieve the multi-mode conversion of the camera and the lens and facilitate a use of the camera, the adjustment base component includes a fixed seat 30, an adjustment seat 31, a first adjustment rod 32, a second adjustment rod 33, and a third adjustment rod 34. A plurality of engagement teeth 300 are provided on the fixed seat 30, and the first adjustment rod 32 is rotatably connected to the adjustment seat 31. A rod body of the first adjustment rod 32 can be selectively clamped with one of the engagement teeth 300; the second adjustment rod 33 is rotatably connected to the fixed seat 30. The adjustment seat 31 is provided with a fixed groove 310 that cooperates with the second adjustment rod 33. When the adjustment base drives the camera and lens to achieve the multi-mode conversion, the second adjustment rod 33 is clamped connected to the fixed groove 310 so as to support the fixed seat 30 and the adjustment seat 31; the third adjustment rod 34 is rotatably connected to the fixed seat 30 and the adjustment seat 31, respectively, so as to achieve an angle adjustment of the base, further realizing an angle adjustment of the camera body.

In an implementation mode, a limiting column 301 is provided on the fixed seat 30, the limiting column 301 can limit a position of the second adjustment rod 33, so that the second adjustment rod 33 can stably support the fixed seat 30 and the adjustment seat 31.

To be specific, according to the usage scenario of the camera, the multi-mode conversion mentioned in the present application can be referred to as: lens changing mode, lower position camera shooting mode, and screen browsing mode.

Figure 4:
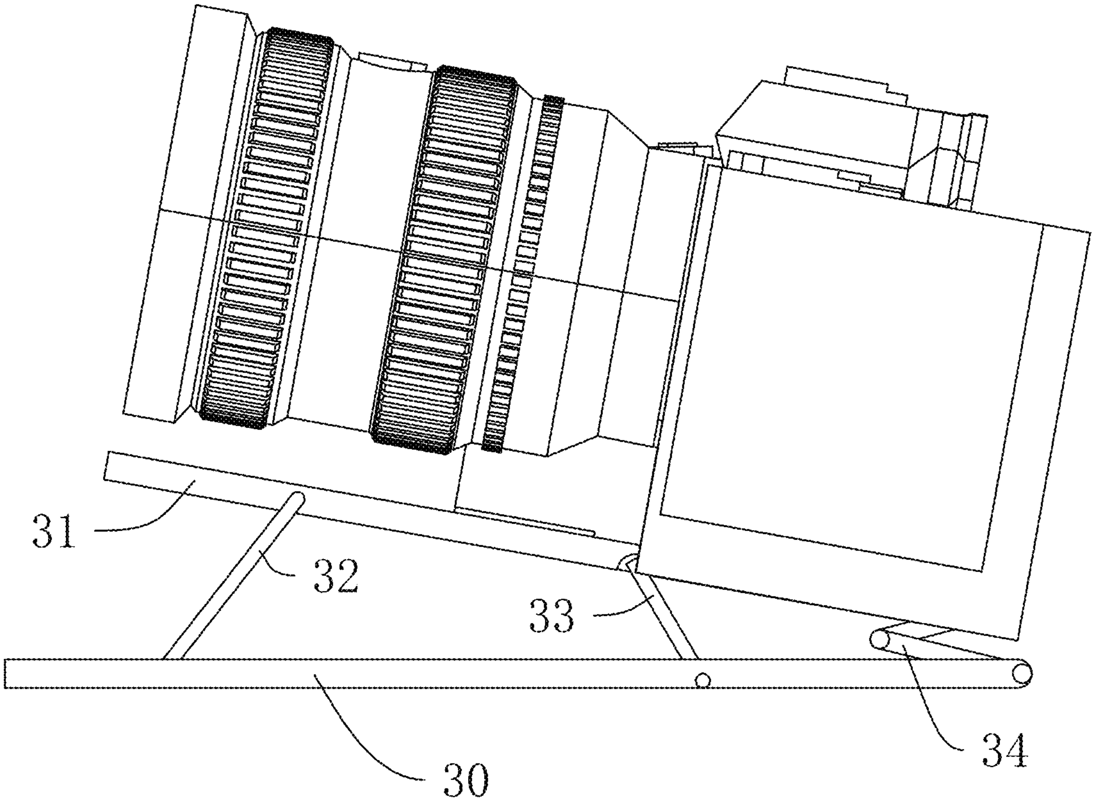
FIG. 4 is a schematic diagram of a lens changing mode in an embodiment.

In an implementation mode, referring to FIG. 4, the traditional steps for replacing a lens are: unscrewing the camera and lens with both hands; putting down the camera and lens separately; unscrewing a rear protective cover of a to-be-replaced lens with both hands; picking up the camera and installing a new lens onto it; picking up the replaced lens and screwing on the rear protective cover. In the lens changing mode of the present application, the second adjustment rod 33 is clamped in the fixed groove 310, and then the first adjustment rod 32 is clamped with different engagement teeth 300, so that the adjustment seat 31 has an upward depression angle, so that after a front of the lens being raised, "unscrewing the lens and installing the rear protective cover, unscrewing the rear protective cover of the to-be-replaced lens and directly installing it on the camera, and finally quickly replacing the second storage module 20 of the lens to match the new lens", which improves speed and efficiency of lens replacement, significantly reducing the possibility of dust entering a rear of the lens or a camera sensor during this process.

Figure 5:
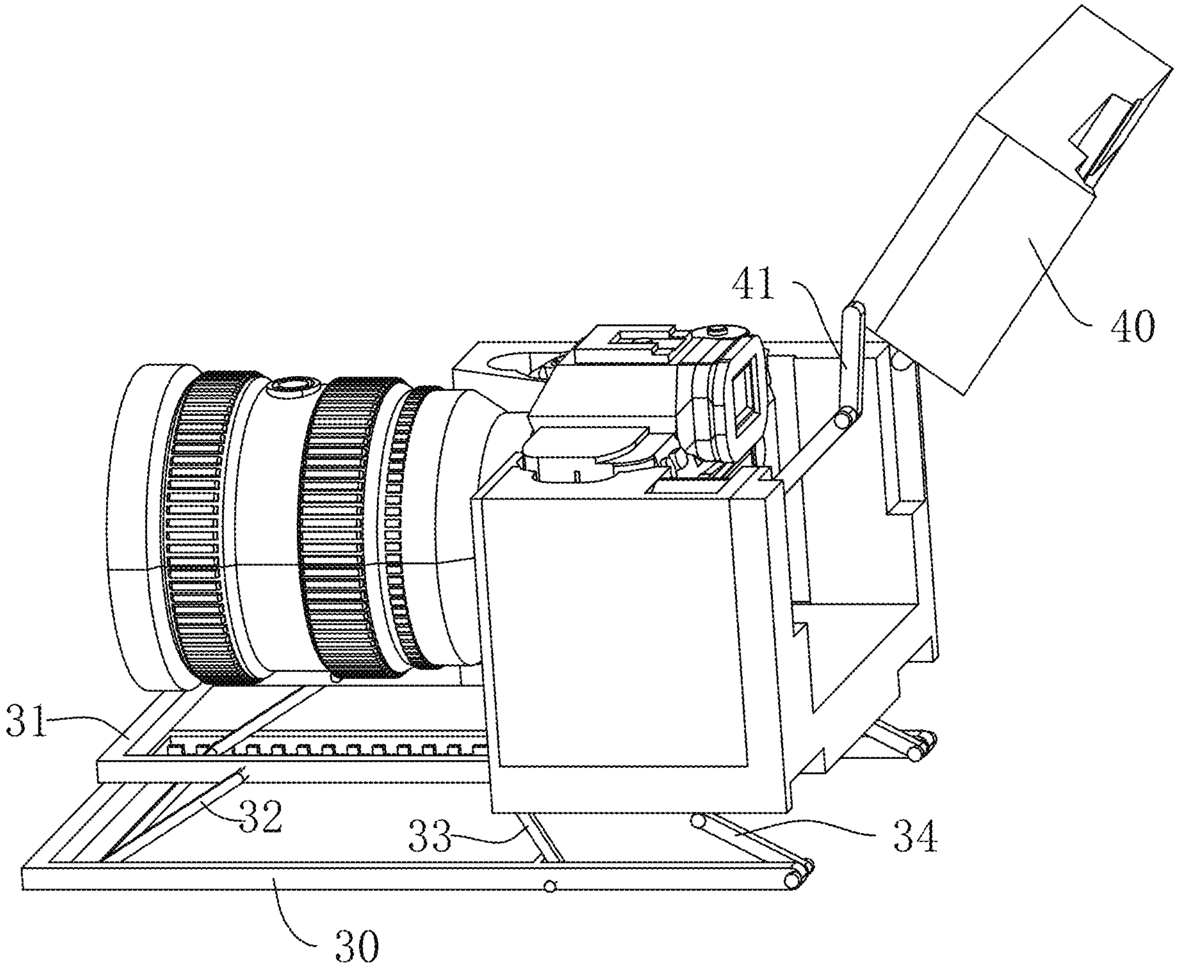
FIG. 5 is a schematic diagram of a lower position camera shooting mode in an embodiment.

Referring to FIG. 5, in the lower position camera shooting mode of the present application, the second adjustment rod 33 is clamped in the fixed groove 310, and then the first adjustment rod 32 is clamped in one of the engagement teeth 300, an unfolding angle of the third adjustment rod 34 is adjusted to provide a lower position camera shooting mode than a tripod, while ensuring the stability of the camera. At the same time, by adjusting an engagement of the first adjustment rod 32 with different engagement teeth 300 and a deployment angle of the second adjustment rod 33, a pitch angle of the shooting can be adjusted, which facilitates the selection of the shooting position.

Figure 6:
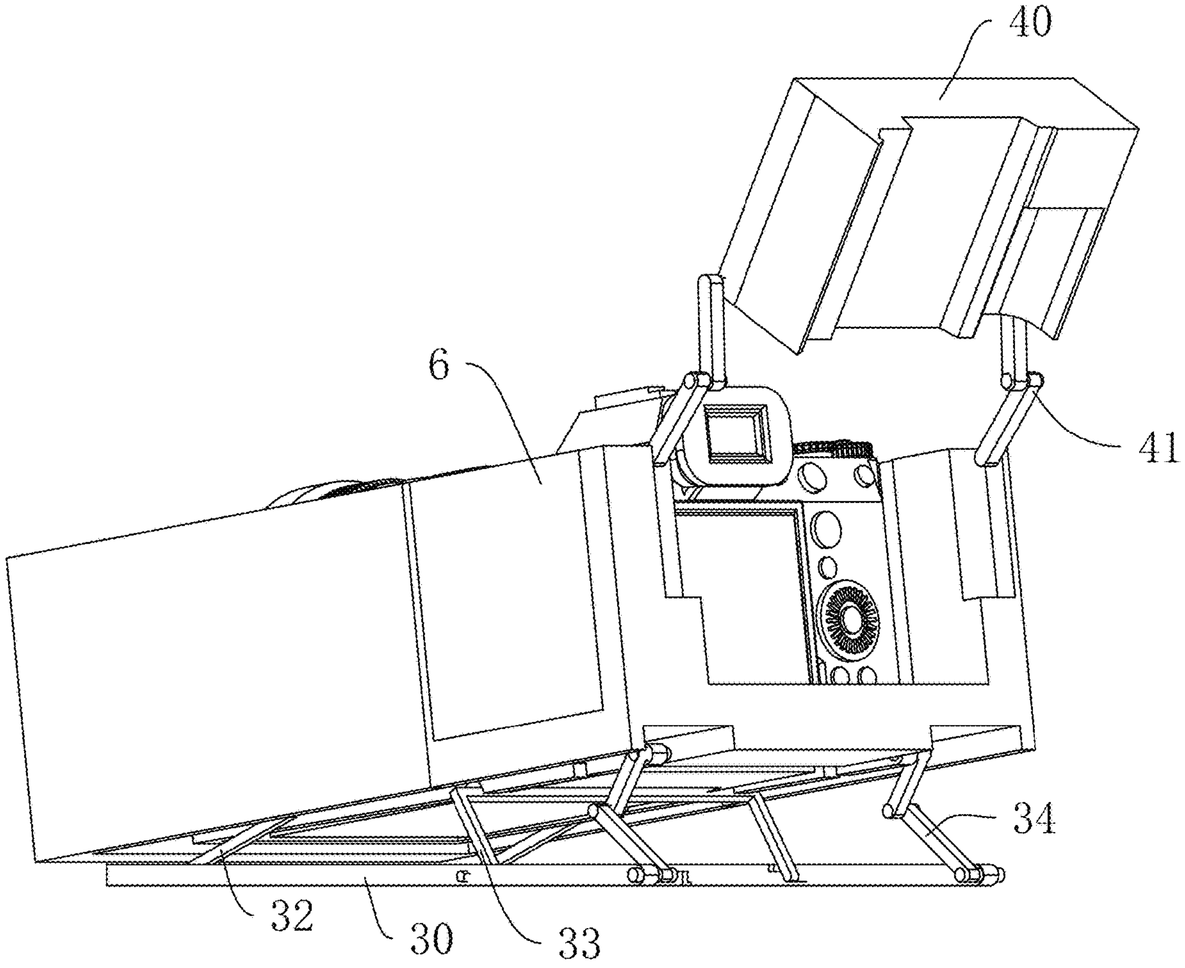
FIG. 6 is a schematic diagram of a screen browsing mode of an embodiment.

Referring to FIG. 6, in the traditional way of browsing shooting materials inside the camera, both hands need to hold the camera. When one end of the camera is heavy, holding it for a long time may not change. In the screen browsing mode of the present application, the second adjustment rod 33 is clamped in the fixed groove 310, and then the first adjustment rod 32 is clamped in one of the engagement teeth 300, an unfolding angle of the third adjustment rod 34 is adjusted to raise the camera body. The fixed seat 30 is placed on a table or other place, and the screen and camera can be viewed and operated without holding, or both a phone and the camera can be operated simultaneously, thereby providing convenient use.

Figure 7:
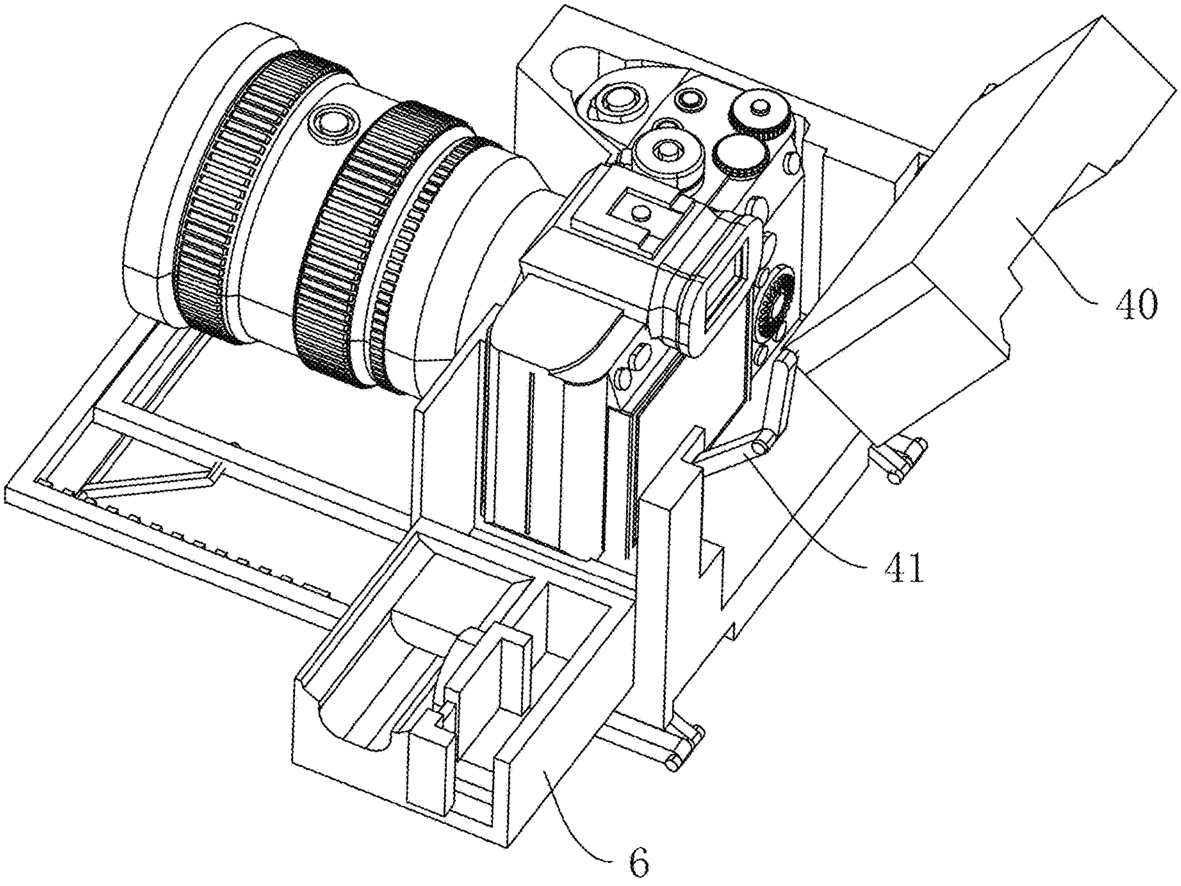
FIG. 7 is an schematic diagram of an open state of a bracket and a light shielding plate in an embodiment.

In this embodiment, referring to FIG. 7, in order to facilitate the use of the camera screen under strong outdoor light, a light shielding component is provided on the second storage module 20. In an implementation mode, the light shielding component includes a light shielding plate 40 and a connector 41. One end of the connector 41 is connected to the first storage module 10, and the other end thereof is connected to the light shielding plate 40. The opening or closing of the light shielding plate 40 is achieved through the connector 41. When the light shielding component is folded, it serves as a part of the first storage module 10. When the light shielding component is unfolded, the light shielding plate 40 can effectively block strong light from shining on a camera body screen, rendering it easy to observe the photos taken.

In an implementation mode, the connector 41 can be a hinge or any other structure capable of opening or closing the light shielding plate 40.

In an implementation mode, the second storage module 20 is further provided with a multifunctional bracket 6. In an implementation mode, the multifunctional bracket 6 is rotatably connected to one side of the first storage module 10. When the bracket 6 is folded, it serves as a part of the first storage module 10. When unfolded, the bracket 6 is configured to accommodate external devices such as a mobile phone, a power bank, and a portable hard drive, thereby enabling the storage module to have a plurality of expansion functions.

Figure 8:
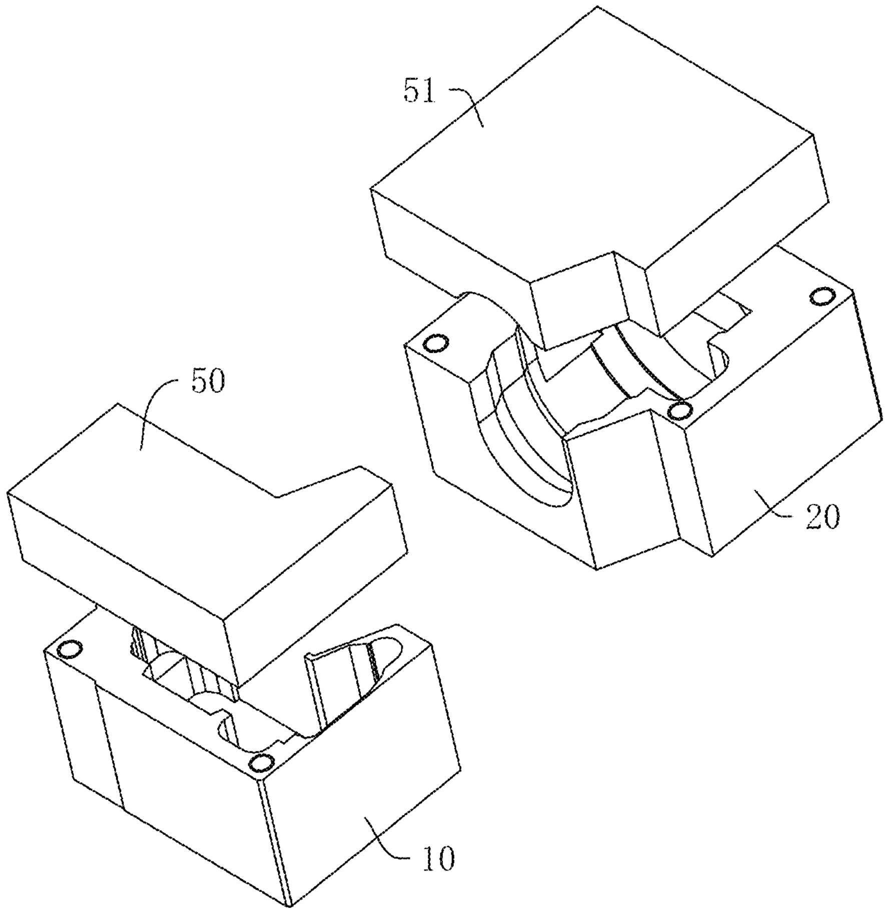
FIG. 8 is a schematic diagram of a first storage module, a second storage module, a third storage module, and a fourth storage module.

In this embodiment, referring to FIG. 8, in order to better protect the camera body and lens in all directions, the storage module further includes a third storage module 50, provided above the first storage module 10, for storing an upper part of the camera body, thereby providing a good all-round storage effect on the camera body. It can also be combined with the first storage module 10 to achieve separate storage of the camera body, achieving good storage and protection effects. A fourth storage module 51 is provided above the third storage module 50 for storing an upper part of the lens, thereby achieving good storage effect for the lens. It can also be used in combination with the third storage module 50 to separately store the lens, achieving good storage and protection effect.

In this embodiment, the first storage module 10 is provided with a first retrieval slot 110. The first retrieval slot 110 is connected to the first storage space for easy retrieval and placement of the camera body; a second retrieval slot 210 is provided on the second storage module 20, and the second retrieval slot 210 is communicated with the second storage space for easy retrieval and placement of the lens.

In this embodiment, the third storage module 50 is connected to the first storage module 10 through a magnetic suction component or a buckle component to ensure a stable and flexible connection between the first storage module 10 and the first storage module 10. Similarly, the fourth storage module 51 is connected to the second storage module 20 through a magnetic suction component or a buckle component to ensure a stable and flexible connection between the fourth storage module 51 and the second storage module 20.

In an implementation mode, the third storage module 50 and the fourth storage module 51 can also be integrated. In an implementation mode, the third storage module 50 and the fourth storage module with the first storage module 20 and the second storage module 20 are connected to using a magnetic component.

In an implementation mode, in terms of the shape of the camera body, a splicing surface between the first storage module 10 and the second storage module 20 can be linear, L-shaped, S-shaped, etc. Correspondingly, a splicing connection surface between the third storage module 50 and the fourth storage module 51 can be linear, L-shaped, S-shaped, etc.

In a second aspect, this embodiment relates to a camera storage bag, including a bag body and the aforementioned camera storage module. The camera storage module is provided in the bag body to facilitate the storage of the camera inside the bag, rendering it easy to carry the camera outside and achieving good protection for the camera.

The above is only used to illustrate the technical solution of the present disclosure and not to limit it. Any other modifications or equivalent substitutions made by those skilled in the art to the technical solution of the present disclosure, as long as they do not depart from the spirit and scope of the technical solution of the present disclosure, should be included in the scope of the claims of the present disclosure.

What is claimed is:

1. A camera storage module, comprising: a first storage module and a second storage module, wherein the first storage module is provided with a first storage space for accommodating a camera body, and the second storage module is provided with a second storage space for accommodating a lens, wherein the first storage module is spliced with the second storage module so that the first storage space is communicated with the second storage space for connecting the camera body to the lens for storage;

bottoms of the first storage module and the second storage module are both connected to an adjustment base component, wherein the adjustment base component drives the camera body and lens to achieve a multi-mode conversion.

2. The camera storage module according to claim 1, wherein there are a plurality of second storage modules, and the plurality of second storage modules correspond to lenses having different sizes;

the first storage module is selectively spliced with different second storage modules for the camera body to connect a corresponding lens for storage.

3. The camera storage module according to claim 1, wherein there are a plurality of first storage modules, and the plurality of first storage modules correspond to camera bodies having different sizes;

the second storage module is selectively spliced with different first storage modules for the lens to connect a corresponding camera body for storage.

4. The camera storage module according to claim 1, wherein the first storage module and the second storage module are detachably connected through a magnetic suction component or a buckle component;

the first storage module and the second storage module are detachably connected to the adjustment base component through a magnetic suction component or a buckle component.

5. The camera storage module according to claim 1, wherein the adjustment base component comprises a fixed seat, an adjustment seat, a first adjustment rod, a second adjustment rod, and a third adjustment rod;

wherein the fixed seat is provided with a plurality of engagement teeth, the first adjustment rod is rotatably connected to the adjustment seat, the first adjustment rod is selectively engaged with one of the engagement teeth, the second adjustment rod is rotatably connected to the fixed seat;

a fixed groove matches with the second adjustment rod is provided on the adjustment seat;

the third adjustment rod is rotatably connected to the fixed seat and the adjustment seat, respectively;

wherein a cooperation of the first adjustment rod, the second adjustment rod, and the third adjustment rod with each other, a pitch angle of the adjustment seat is changed to achieve the multi-mode conversion between the camera body and the lens.

6. The camera storage module according to claim 1, wherein a light shielding component is provided on the second storage module, the light shielding component serves as a part of the first storage module when folded and is configured to prevent strong light from shining on a camera body screen when unfolded;

a bracket is further rotatably connected to the second storage module, the bracket serves as a part of the first storage module when folded and is configured to install a mobile phone, a power bank, and a portable hard drive when unfolded.

7. The camera storage module according to claim 1, further comprising a third storage module and a fourth storage module, wherein the third storage module is connected to the first storage module for storing the camera body, and the fourth storage module is connected to the second storage module for storing the lens.

8. The camera storage module according to claim 1, wherein a first retrieval slot is provided on the first storage module; and the first retrieval slot is communicated with the first storage space for easy retrieval and placement of the camera body;

a second retrieval slot is provided on the second storage module; and the second retrieval slot is communicated with the second storage space for easy retrieval and placement of the lens.

9. The camera storage module according to claim 7, wherein the third storage module is connected to the first storage module through a magnetic suction component or a buckle component, and the fourth storage module is connected to the second storage module through a magnetic suction component or a buckle component.

10. A camera storage bag, comprising a bag body and the camera storage module according to claim 1, wherein the camera storage module is provided in the bag body.

* * * * *